Patented Nov. 20, 1951

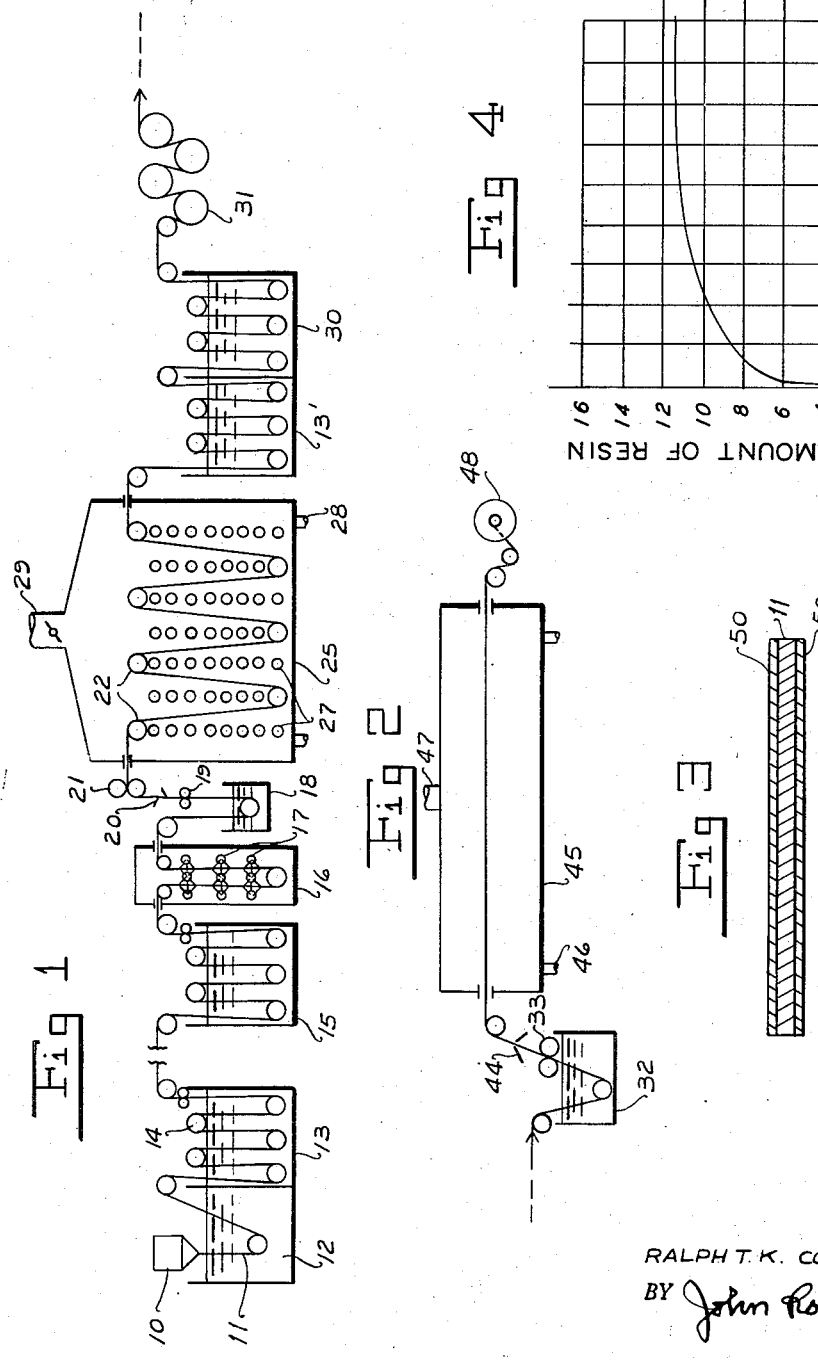

2,575,443

UNITED STATES PATENT OFFICE 2,575,443

PROCESS FOR THE MANUFACTURE OF MOISTUREPROOF SHEET MATERIAL

Ralph T. K. Cornwell, Fredericksburg, Va., assignor, by mesne assignments, to American Viscose Corporation, Wilmington, Del., a corporation of Delaware Application April 9, 1946, Serial No. 660,619

6 Claims. (Cl. 117—145)

This invention relates to pellicles of hydrophilic material and, more particularly, to a process and apparatus for the treatment of hydrophilic pellicles to enhance their properties, especially to improve the anchorage of subsequently applied coatings to such pellicles.

Pellicles formed of hydrophilic material are swelled by water and are permeable to water vapor so that their uses are relatively limited. To improve their permeability to moisture, such pellicles have been coated with a moistureproofing composition. However, moistureproofing materials are hydrophobic and show little tendency to permanently adhere to hydrophilic pellicles. Water penetrates the coating, the hydrophilic pellicle swells, and the moistureproofing coating loosens and detaches from the film.

Hydrophilic pellicles have also been used as a base for adhesive tapes, such as transparent pressure-sensitive adhesive tape. The adhesive coatings heretofore employed are hydrophobic materials which, like the moistureproofing compositions, do not exhibit substantial adhesion to the pellicle, and delaminate objectionably in unrolling the adhesive tape.

Hydrophilic pellicles have also been employed for production of decorative sheet materials. For this purpose, designs, letters and other indicia are printed upon the surface of the pellicles. The printing inks commonly employed for this purpose are hydrophobic film-forming materials dissolved in organic solvents. Such ink deposits exhibit a poor adhesion to the pellicles, particularly when the printed film is brought into contact with water.

In an attempt to improve the adhesion of hydrophobic coatings, an intermediate anchor coating has been applied to the dry pellicle. This increases the thickness and weight of the pellicle, reduces its flexibility and drape, and doubles the coating costs. The anchoring coating is applied, dissolved or dispersed in an organic solvent. After the anchor coating has been applied and the solvent evaporated, the film is coated with the moistureproofing or adhesive or printing composition dissolved in an organic solvent. This necessitates a second drying operation. It is apparent, therefore, that the application of an anchor coating necessitates two separate coating operations and two drying operations in addition to the initial drying of the pellicles during its manufacture. These operations greatly increase the cost of the coated material and involve a double use of coating equipment. Moreover, loss of moisture present in the pellicle occurs with evaporation of the organic solvent, resulting in a brittle pellicle.

In order to avoid the necessity of coating the pellicle twice it has been proposed that the pellicle be impregnated with a water solution or dispersion of the anchoring composition. However, this has not been entirely successful. When the dried pellicle is impregnated good penetration and anchorage is not obtained. Apparently, in the drying process water is driven out of the pellicles until the gel hardens and the resulting pellicle is no longer receptive to the impregnating solution. An irreversible change appears to take place in the gel structure of the hydrophilic pellicle when it is dried in accordance with present commercial practices.

The alternative is to apply the resin composition to the wet gel pellicle. But this requires use of a dilute resin solution, and when the wet gel pellicle is impregnated with the anchoring composition, the water in the pellicle dilutes the impregnating composition still further so that it becomes almost impossible to obtain a concentration of resin composition in the pellicle sufficiently great to adequately anchor the hydrophobic moistureproofing, adhesive or printing composition to the pellicle.

Moreover, until recently the dispersions and solutions of synthetic resins available for use as impregnating compositions have been inadequate for the purpose. They have proved unstable in many instances, it being difficult to arrest the polymerization of the resin at a convenient point. As a result the dispersion or solution is continuously increasing in viscosity, thus giving great practical difficulties in impregnation since only solutions of low viscosity are able to penetrate the pellicle to the required extent. Furthermore, such solutions have almost invariably coated as well as impregnated the pellicle. Frequently, resin particles in the dispersion have precipitated within the pellicle, thus making the pellicle opaque.

The general object of the present invention is to modify nonfibrous hydrophilic pellicles, in particular regenerated cellulose, to improve the adhesion of hydrophobic film-forming materials to the surface thereof without the employment of an anchor coating. Another object is to modify pellicles formed of nonfibrous hydrophilic materials so as to stabilize their dimensions, decrease their swelling in the presence of water, and improve their printing properties and surface-slip characteristics. A specific object of the present invention is to provide a moistureproof coated regenerated cellulose film whose coating exhibits no tendency to separate from the film when placed in contact with water for long periods of time. A further specific object of the invention is to provide an apparatus for modifying hydrophilic films during their manufacture in a continuous manner so as to improve the anchorage of hydrophobic coatings thereto.

According to the present invention a hydrophilic pellicle in the wet gel state, prior to impregnation with a resin solution and prior to plasticizing and initial drying, is partially dehumidified in order to reduce its moisture content to 25% to 65% by weight of the wet gel pellicle, without however altering the wet gel structure of the pellicle. The wet gel pellicle is then impregnated with the resin solution, the impregnated pellicle subjected to a precuring treatment to advance the polymerization of the resin condensate to a point at which the resin particles are no longer extractable from the pellicle by aqueous or organic solvents, and the impregnated pellicle still in the wet gel state is then washed, plasticized and dried. Thereafter, the pellicle may be treated with a moistureproofing hydrophobic film-forming composition, if desired, the resin impregnate adhering the moistureproofing composition to the pellicle even in the presence of liquid water.

It is preferred to arrest the polymerization of the resin condensate during the precuring treatment at a stage short of complete polymerization, preferably in which the condensate is still thermoplastic. Polymerization of the resin condensate to a nonthermoplastic stage is then continued during drying and before or after coating the pellicle with a hydrophobic film-forming composition where such a coating is employed.

The treatment for the reduction of the moisture content referred to hereinafter as the "dehumidifying" treatment should not be confused with commercial drying of hydrophilic pellicles. In the latter process water is driven out until the gel hardens and the resulting pellicle is no longer as receptive to the colloidal solution as the dehumidified pellicle of the present invention. An irreversible change appears to take place in the gel structure of the hydrophilic pellicle when it is dried in accordance with present commercial practices. This invention relates only to the impregnation of wet gel pellicles.

The process of the invention is shown in the accompanying drawing.

Figure 1 is a diagrammatic representation in side elevation of one embodiment of suitable means for carrying out the process of the invention;

Figure 2 is a diagrammatical representation in side elevation of one embodiment of means for applying a film-forming composition to the pellicle formed by the apparatus of Figure 1;

Figure 3 is a cross-section of a coated pellicle according to the present invention;

Figure 4 is a graph showing the rate at which resin is taken up by the pellicle in a given period of time.

Nature of the pellicle

The hydrophilic pellicles used in the present invention may be produced from any suitable water-insoluble hydrophilic film-forming materials, such for example as regenerated cellulose, whether formed from viscose solutions, cuprammonia solutions, or solutions of cellulose in inorganic or organic solvents, alkali-soluble, water-insoluble cellulose ethers, gelatin, casein, deacetylated chitin, water-insoluble polyvinyl alcohol, and water-insoluble alginate salts. The pellicles may be in the form of films, sheets, tubing, bands or shaped hollow bodies. The invention has particular reference to the formation and treatment of pellicles of regenerated cellulose plasticized with glycerine and known in the trade as cellophane.

The melamine-formaldehyde impregnating composition

It has been found that an acidic aqueous colloidal solution containing from about 0.5% to 20% by weight, preferably from 2 to 5% by weight, of a partially polymerized melamineformaldehyde condensation product is well suited for the impregnation of hydrophilic pellicles in order to improve the anchorage of hydrophobic film-forming materials thereto. This resin solution is characterized by being waterdilutable, colloidal in nature and having positively charged hydrophilic particles of condensation product of less than one micron in diameter, in a state of polymerization less than that of a gel, and is fully described in U. S. 2,394,009 to John D. Pollard, issued February 5, 1946.

Preparation of the melamine-formaldehyde acid colloidal impregnating composition The aminotriazine - aldehyde - condensation products which may be employed in this composition are prepared by reacting in an alkaline medium 1 mole of the aminotriazine such as for example, melamine, with from 2 to 10 moles of an aldehyde, such as formaldehyde, acetaldehyde, propionaldehyde, or other aliphatic aldehydes, as well as furfural, etc.

The condensation product preferred is a methylol melamine, containing approximately 2 to 6 moles of formaldehyde per mole of melamine, preferably 3.3 moles of formaldehyde combined with 1 mole of melamine. These condensation products are unpolymerized or only partially polymerized; that is, they are uncured. They are soluble in water, with heating if necessary, or soluble in dilute solutions of strong acids.

The methylol melamine condensation product is dissolved in an aqueous solution of an acid. Suitable acids are, for example, hydrochloric, sulfurous, phosphoric, acetic, and formic acid. Depending on the amount of methylol melamine to be dissolved, the amount of acid used may vary from about 0.1 to 4.0 moles per mole of methylol melamine. In most cases the pH of the solution is above 0.5 but below 3.0 and always less than 4.0. The amount of acid depends somewhat upon the concentration of the resinous solution. For example, in a solution containing 12% of methylol melamine, from about 0.7 to 1.4 moles of hydrochloric acid per mole of methylol melamine may be used. As the concentration of the methylol melamine in the aqueous solution is decreased, one may use a lower molecular proportion of acid. Thus, for example, in an aqueous solution containing 3% of methylol melamine, an amount of acid corresponding to about 0.4 mole per mole of methylol melamine has resulted in the formation of aged solutions satisfactory for use in the process.

After the methylol melamine has been dissolved in the acid solution, it is allowed to age until the dispersion is water dilutable and colloidal in nature and until the particles of resin are positively charged and less than one micron in diameter. The aging period varies with a number of factors, and it is not possible to give the exact aging period for all conditions. At room temperatures at a resin concentration of 12% and a molecular methylol melamine acid ratio of 1:1, the aging period may be from 24 to 48 hours. At refluxing temperature the aging may be reduced to 4 or 5 hours. Again, at room temperatures, using a methylol melamine acid ratio of 1:0.8, the aging period may vary from 5 to 24 hours for optimum results. Of course, if the solution is used before it has reached its optimum aging period, for example after 2 hours, it will nevertheless give greatly improved results over those solutions which have not been aged at all.

The extent of aging can be readily ascertained by passing a beam of light through the solution until the well known Tyndall effect is observed. Under such conditions the size of the partially polymerized methylol melamine particles will not exceed about one micron in diameter. Consequently, when the aged solution is placed in an electrophoresis cell and a direct current is applied, the resinous particles will migrate toward the cathode, thus indicating that the particles are positively charged. As regenerated cellulose normally carries a negative electrical charge, the positively charged resin particles in the aged dispersion are preferentially adsorbed by the cellulose.

Another characteristic of the properly aged dispersion is that the dispersion is infinitely dilutable with water without causing precipitation of the resin particles from the dispersion and may be stored for weeks without undergoing substantial change.

A further test to indicate that the dispersion is aged to the proper extent and that the colloidal solution is suitable for use consists in the addition of concentrated hydrochloric acid to a small amount of the aged solution. If a precipitate is obtained, the presence of small amounts of partially polymerized cationic resin is indicated. An unaged solution will not respond to the test.

The particular melamine-formaldehyde condensate solution employed in the present invention is defined in the present specification and claims in the following exact language: "Acidic, aqueous, colloidal solution containing from about 0.5% to 20% by weight of a partially polymerized melamine-formaldehyde condensation product, said product being in a state of polymerization less than that characterizing a gel, being water-dilutable, colloidal in nature, and having positively charged, hydrophilic particles of less than one micron in diameter."

*Manufacture and treatment of the pellicle with the impregnating composition*

The pellicles may be formed in any suitable manner by casting, extrusion, or by coating the film-forming material upon a suitable surface, and coagulating and hardening the film. Figure 1 shows an application of the process to the manufacture and treatment of cellophane from viscous solutions. The viscose is extruded from the hopper 10 in the form of a film 11 which is coagulated and regenerated in the bath 12. Thereafter, the film is passed through a series of vats, such as the vat 13, provided with conveying rollers 14 for the purpose of regenerating, washing, desulphurizing, bleaching, dyeing and other conventional treatments. Since the solutions used in these treatments are aqueous, the freshly formed pellicle will be delivered to the vat 15 in the wet gel state.

The treatment in the vat 15 prepares the wet gel pellicle for dehumidification. The vat may contain either hot water or a hot dilute acid solution, preferably, a solution containing between about .25 to 0.75% of a strong monobasic acid, by weight. Bath temperatures between 60 and 100° C. are preferred. This treatment heats the pellicle to a temperature between 50-95° C. facilitating the dehumidification, and renders it slightly acid. The acid solution neutralizes any alkaline reagent which may be present in the pellicle thus preventing precipitation of the resin in the acidic colloidal solution during the later impregnation.

The hot film is next passed to the chamber 16 wherein it is partially dehumidified, preparing the wet gel pellicle for impregnation with the melamine-formaldehyde resin solution. In this chamber, the film 11 is subjected to blasts of hot or cold air introduced through the nozzle 17. The air is blown over the surface of the pellicle, and thus removes moisture from the warm film, lowering its moisture content to the desired point.

Since the wet gel pellicle contains normally about 80% by weight of water, a reduction of about 20% in the moisture content is desirable. It has been found that a reduction in the moisture content to the point where the pellicle contains from 25 to 65%, preferably about 50%, by weight is suitable to effect proper impregnation with the resin colloid. It is not desirable to reduce the moisture content to less than 25% by weight of the film since this increases the danger of drying the pellicle completely, thereby inducing the irreversible change in the gel structure of the pellicle which inhibits impregnation of the pellicle by the resin colloidal solution. The reduction in the moisture content may be controlled by introducing air of the proper humidity to carry off only the amount of moisture desired.

The partially dehumidified film is then treated with the resin colloid solution by passage into the vat 18. The solution preferably contains from 2 to 5% resin by weight. The colloidal solution may also be applied by spraying, dipping, padding or by other suitable means. Contact of the pellicle with the resin solution need be only momentary since the resin solution is taken up extremely rapidly by the partially dehumidified pellicle.

The rate of absorption of the solution by the pellicle is shown in Figure 4. This graph shows the rate at which the resin colloid is absorbed by the pellicle. It will be noted that as much as 5% by weight can be introduced into the pellicle in less than one minute. Since approximately 1% of the resin by weight of the pellicle is sufficient, it is apparent that the film need contact the resin solution for only 20 seconds or less.

After impregnation the film is passed through a pair of squeeze rolls 19 which remove excess solution, between the pair of scrapers 20, and then through a pair of squeeze rolls 21. The pellicle is then conveyed in a circuitous path by means of the rolls 22 through the precuring chamber 25. During the passage through the chamber, which is heated to 90° C. by suitable means such as steam coils 27, polymerization of the resin is advanced. In order to carry off vapors liberated during polymerization, air is passed through the curing chamber, entering through the pipes 28 and passing out through the flue 29.

It has been found that if the impregnated pellicle is passed directly from the colloidal solution into a washing or softening bath substantially all of the resin will be extracted from the pellicle. Therefore, in the precuring treatment it is essential to advance the polymerization so that the particles are no longer extractable from the pellicle by aqueous solutions. The resin molecules combine chemically with the cellulose during the precuring and increase in size to such an extent that they cannot diffuse from the pellicle, The precuring is accomplished at temperatures from 40 to 100° C., preferably from 90° to 100° C. The passage time required for proper curing will be dependent upon the amount of acid present in the film and the particular temperature. With an increase in temperature and in acid concentration, the passage time required will be shortened. At a temperature of 90 to 100° C. and a monobasic acid concentration of 0.25% to 0.75% by weight, a suitable curing time is 15 to 20 seconds.

Polymerization of the resin is halted while the resin is still in an incompletely polymerized, preferably thermoplastic, state by cooling the film. This may be achieved by passage through the washing vat 13' which also removes acid and unreacted resin colloid present in the film. The impregnated film is plasticized by treatment in the vat 30 and then dried by suitable means such as the heated rollers 31. The softening agent may be glycerine, ethylene glycol, sorbitol, ethanolamine lactate, ammonium sulfamate, or another suitable hygroscopic substance in aqueous solution. A bath containing 3½ to 4% plasticizer gives a concentration in the pellicle after drying of approximately 15% by weight. Preferably, the washing or plasticizing bath contains a small amount of an alkaline substance, for example, sodium carbonate, to give such bath a pH between 6.5 and 8. Thereafter the treated film is dried as on rollers, 31, while the pellicle is in a neutral or slightly alkaline state. If desired, the dried film at this point may be wound into a roll or it may be passed directly to the coating apparatus shown in Figure 2.

The coating apparatus may be of conventional design comprising, for example, a vat 32 containing the solution of coating composition, through squeeze rolls 33, doctor blades 44, and through a drying chamber 45 to remove the solvent. Air is admitted to the chamber through the pipes 46 and passed out through the pipe 47. The dry coated film is then wound up on the reel 48.

The article produced according to this process is shown in Figure 3 and comprises an impregnated pellicle 11, coated on both sides with the continuous film 50 of hydrophobic material. It will be noted that no impregnating composition is indicated in the drawing. Actually, none is visible. The sheet is transparent and carries no perceptible coating. A slight difference in the feel is the only indication that the material has been impregnated with a resin composition.

The following examples illustrate the application of the invention:

*Example I*

Three moles of melamine mixture were mixed with 10 moles of aqueous 30% formaldehyde to give a solution having a pH of 9.0. The solution was heated for thirty minutes, cooled, and the resulting crystalline condensate separated and dried. Fifty parts by weight of the condensate were dissolved in an aqueous solution containing 27.6 parts of 18° Bé. hydrochloric acid and 125 parts of water, thus giving a solution containing 25% by weight of the resin. The solution was diluted to 14% by weight of the resin and allowed to age at room temperature for 24 to 28 hours. A bluish haze developed and the solution then exhibited the Tyndall effect thus indicating that the resin particles had a diameter between 0.1 and 1.0 microns. The particles migrated toward the cathode when a direct current was passed through the solution.

A sheet of regenerated cellulose in the wet gel state prepared according to the process illustrated in Figure 1 was passed through an acid solution containing 0.25% of hydrochloric acid by weight and having a temperature between 60 to 80° C. The film was thereby rendered acidic. The hot film was then dehumidified from a moisture content of approximately 80% by weight to a moisture content of approximately 40% by weight by blowing warm air over it. The dehumidified pellicle while still in a wet gel state was then dipped in a bath containing the above melamine-formaldehyde resin solution, which had been diluted to 3% by weight of the resin and was held at a temperature of 40° C. The contact time of the film in the bath was 20 seconds, in which period sufficient resin solution penetrated the film to give a concentration in the film between 1 and 1.5% by weight of resin.

It was found that by permitting the film to remain in the bath for one minute sufficient resin solution entered the film to give a resin concentration of approximately 4.5%. Immersing the film in the solution for 30 minutes, sufficient resin solution entered the film to give a resin concentration of approximately 9% while after three hours a resin concentration of 11.3% by weight was obtained.

These results show that the resin is selectively adsorbed from a dilute solution by the dehumidified regenerated cellulose film, to give a higher concentration in the film than in the solution. This indicates conclusively that there is a chemical or physical interaction of some sort between the film and the resin.

The impregnated pellicle was passed through squeeze rolls to remove excess solution and then heated at a temperature of 95° C. for 20 seconds. During this period polymerization of the resin advanced to a point at which the resin could not be dissolved out of the pellicle by an aqueous solution, but the resin at the end of this period was still in a thermoplastic state.

The impregnated film after its precuring operation was passed into a plasticizing bath containing 3½ to 4% of glycerine. Sufficient glycerine entered the film to give a concentration of 15% by weight of glycerine in the finished pellicle. When a commercially pre-dried regenerated cellulose film is treated with an aqueous glycerine solution it is necessary to employ a solution containing 15% by weight of glycerine in order to get a concentration of 15% by weight of glycerine in the film. Furthermore, the regenerated cellulose film according to this invention was found to be easier to dye than commercially pre-dried plasticized films.

The finished product was studied to determine its distinguishing properties. The pellicle was treated with a stain which is selectively adsorbed by melamine-formaldehyde resin but which does not affect regenerated cellulose. The stain dyed the film uniformly throughout, thus indicating that the resin had either chemically united with the film or was dispersed throughout the film in such small particles and so uniformly that variation in the stain could not be detected by ordinary instruments.

No trace of a surface coating of resin was found. However, the film had a reduced slickness so that the material could be wound in large diameter rolls without telescoping. Apparently, although no continuous coating is present on the surface of the pellicle, the resin had modified the surface of the pellicle so as to reduce its smoothness in some undetectable way.

The anchorage of hydrophobic materials was found to be markedly improved by the impregnating composition so that the film was perfectly adapted for use in the manufacture of moistureproof coated regenerated cellulose or other products requiring a coating or printed deposit of a hydrophobic composition.

*Example II*

A water-soluble melamine-formaldehyde resin prepared using one mole of melamine and 3.35 of formaldehyde was boiled with five times its weight of water until dissolved. After cooling an approximately equimolecular quantity of hydrochloric acid was added to the solution. Upon standing at room temperature for several days the solution developed the characteristic bluish haze indicative of the presence of colloidal resinous particles of ultra-microscopic size in the solution. These particles were found to be positively charged by testing in an electrophoretic cell.

This solution was diluted to a 5% resin concentration by weight and a regenerated cellulose pellicle treated with the solution according to the procedure of Example I, after having been dehumidified to a moisture content of approximately 50%. After immersion in the resin bath for ten seconds a pellicle having a resin concentration of approximately 2% by weight was obtained. This pellicle was partially cured and then plasticized with sorbitol in the usual way. It was found to have properties similar to that of the pellicle prepared according to Example I.

*Example III*

Forty two parts of 37% aqueous formaldehyde (0.5 mole) was mixed with 20 parts by weight of melamine (0.17 mole) and heated with 160 parts of water and approximately 0.5 of hydrochloric acid and then added with sufficient water to dilute the mixture to a total weight of 420 parts. The mixture was then heated at 40 to 50° C. for 2½ hours whereupon a clear solution was obtained. This solution was aged for 24 to 48 hours at room temperature thereby obtaining the melamine-formaldehyde resin solution in accordance with the invention. This solution was diluted to 10% resin solids at which it may be stored for weeks without appreciable change in the colloidal content of the resin.

This resin solution was diluted to a concentration of 2% and used to impregnate a regenerated cellulose pellicle which has been dehumidified to a moisture content of 25% by weight. Upon immersion of the film in the resin solution for 15 seconds a concentration of 1% resin by weight in the film was obtained. This film after precuring and then plasticizing with ethylene glycol according to the procedure in Example I was found to offer excellent anchorage to hydrophobic moistureproofing adhesive or printing compositions.

*Example IV*

Regenerated cellulose sheets prepared according to Examples I, II, and III were each coated with a hydrophobic moistureproofing composition comprising:

| | Parts |
|---|---|
| Nitrocellulose | 5–10 |
| Urea-formaldehyde resin in a thermoplastic stage | 60–85 |
| Plasticizer | 10–30 |
| Hardener, percentage of the total solids | 7–13 |

Solvents, sufficient quantity to form a solution containing 1 to 15% solids, depending upon the viscosity of the nitrocellulose.

The solution was applied to the coated pellicle and warmed at 98° C. in a humid atmosphere to evaporate organic solvents. The drying operation also resulted in interpolymerization and co-condensation of the urea-formaldehyde resin in the coating and the melamine-formaldehyde resin in the regenerated cellulose pellicle, converting each of the resins to an insoluble stage. The coating was firmly anchored to the pellicle in all cases so that it was not affected by water even when immersed for a long period of time.

The coating may have any degree of moistureproofness imparted thereto by adding 0.5 to 2% paraffin without affecting the adherence of the coating to the pellicle.

*Example V*

Pellicles of regenerated cellulose prepared according to Examples I, II, and III plasticized with glycerine or sorbitol were each passed through a rotary press and printed with a hydrophobic ink comprising:

| | Parts |
|---|---|
| Base: Urea-formaldehyde resin | 40 |
| Plasticizer: Alkyd resin | 16 |
| Hardener: Ammonium thiocyanate | 3 |
| Pigment: Titanium oxide | 5 |

50 parts of the composition were dissolved in 50 parts of solvent mixture comprising:

| | Parts |
|---|---|
| Toluene | 90 |
| Butyl alcohol | 5 |
| Ethylene glycol mono-ethyl ether | 5 |

The printed pellicle was then passed into a dryer and warmed at a temperature of about 80° C. for three to four minutes. This converted the melamine-formaldehyde impregnate to an infusible nonthermoplastic stage. At the end of this period the ink was in all cases found to be nontacky, glossy, and strongly adherent to the pellicle even when immersed in water for long periods, and durable and resistant to normal conditions of use. The pellicle may be immediately wound into a roll or stacked without slip sheets as it leaves the printing machine without smearing the ink.

*Example VI*

Pellicles of regenerated cellulose prepared according to Examples I, II, and III were each coated with a moistureproofing composition comprising from 5 to 20% of a copolymer of vinylidene chloride and vinyl chloride dissolved in a solvent composed of 80 parts toluene and 20 parts dioxane. Higher viscosity polyvinylidene chloride resins may be dissolved in methyl ethyl ketone or methyl isoamyl ketone. The solvent was evaporated at a temperature from 75 to 90° C. thereupon converting the melamine-formaldehyde resin to a nonthermoplastic state and producing a waterproof moistureproof nontacky transparent coating securely anchored to the pellicle.

The polyvinylidene resin moistureproofing coating did not loosen even after immersion in water for several weeks. When adhered to unimpregnated regenerated cellulose, the polyvinylidene chloride film floats off as soon as the film is thoroughly wet.

Example VII

Regenerated cellulose pellicles prepared according to the processes of Examples I, II, and III were each coated with a composition comprising 30% rubber, 23% ester gum, 23% methyl abietate and 24% wax having a melting point of 70° C. The ingredients were coated on the regenerated cellulose as a hot melt at a temperature of 80° C. by means of a doctor blade. The films were then heated at 90° C. in order to advance the polymerization of the melamine-formaldehyde condensate to a nonthermoplastic stage, securely anchoring the adhesive composition to the film.

The adhesive films were tested by immersion in water for several weeks. No delamination of the adhesive film from the pellicle was noted. After storing in roll form for several weeks the cellophane could readily be stripped off without delamination of adhesive.

It is important that the order of steps in the process of the present invention be carefully preserved since it is in part upon this order of steps that the advantage of the present invention rests.

The advantages in dehumidifying the pellicle prior to impregnation with the melamine-formaldehyde resin cannot be over-emphasized. Excess moisture present in the pellicle prevents rapid efficient penetration of the pellicle by the resin solution. Moreover, moisture present in the pellicle dilutes the solution considerably thus decreasing the concentration of resin eventually obtained in the pellicle, and increasing the length of time required for the adsorption of the resin by the pellicle.

It is desirable that the pellicle be warmed prior to the dehumidifying treatment. This is best accomplished by immersing the pellicle in a warm acid or water bath since the warming operation is thereby prevented from drying the pellicle and thus converting it irreversibly to the dried state.

The melamine-formaldehyde colloidal solution should be added to the wet gel hydrophilic pellicle prior to treatment with plasticizers or other ingredients. Moreover, reactive plasticizers such as glycerine or ethylene glycol tend to take part in the polymerization of the resin thus undesirably modifying the properties of the pellicle obtained and they also would be extracted in the washing bath.

The precuring step is also an important feature of the present invention. This operation advances the polymerization of the resin to a point at which it cannot be dissolved out of the pellicle by aqueous solution and most organic solvents. If this is not done the melamine-formaldehyde resin is dissolved out of the pellicle in the plasticizing bath. It is also essential that polymerization of the resin be terminated short of a nonthermoplastic stage during the precuring operation. Best anchorage effects are obtained by completing the polymerization of the resin after it has been coated or treated with a moistureproofing adhesive or printing composition.

After precuring the film is plasticized in the usual way. Because of the dehumidified state of the pellicle it is possible to employ very dilute solutions of plasticizers and still obtain a plasticizer concentration in the pellicle equal to that generally obtained when impregnating dried pellicles with a more concentrated plasticizing bath. Use of a dilute plasticizing bath is a great convenience and economy since the pellicle, when it leaves the bath, carries a smaller amount of plasticizer with it on its surface thus being more readily dried over the drying rolls without undue sticking thereto. Less plasticizer is lost as a result.

It is possible to include in the melamine-formaldehyde resin solution hydrophilic colloids such as polyvinyl alcohol, Carbowax, gelatin, water-soluble cellulose ethers, dimethyl urea, gum tragacanth and deacetylated chitin. These may be added to produce modifications in properties of the finished pellicle. The colloid may also be applied in a separate bath after application of the melamine-formaldehyde solution but prior to the precuring operation.

Having described my invention, what I claim as new and desire to secure by Letters Patent is:

1. A process of treating nonfibrous organic hydrophilic films which comprises reducing the moisture content of a gel regenerated cellulose film, which has never been dried sufficiently to convert it from a wet gel state, until the moisture content is between 25% and 65% by weight, impregnating the film thus obtained with an acidic, aqueous colloidal solution containing from about 0.5% to 20% by weight of a partially polymerized melamine-formaldehyde condensation product, said product being in a state of polymerization less than that characterizing a gel, being water-dilutable, colloidal in nature, and having positively charged, hydrophilic particles of less than about one micron in diameter, advancing the polymerization of the melamine-formaldehyde condensation product to a stage at which the resin cannot be dissolved out of the film by aqueous solutions, then impregnating the film with a plasticizer for the regenerated cellulose, and subsequently drying the plasticized film.

2. A process in accordance with claim 1 in which the resin is still thermoplastic at the time of impregnation with the plasticizer and the resin-impregnated film is washed prior to impregnation with the plasticizer, and the condensation product is cured to a non-thermoplastic state after impregnation with the plasticizer.

3. The process in accordance with claim 2 in which the dried film is coated with a hydrophobic moistureproofing material, and the coated film is subsequently dried.

4. A process in accordance with claim 3 in which the curing is performed prior to the coating.

5. A process in accordance with claim 1 in which the impregnated film is coated with a moistureproofing material and polymerization of the melamine-formaldehyde condensation product is thereafter advanced to a nonthermoplastic stage.

6. The process of claim 5 in which the moistureproofing material comprises a copolymer of vinylidene chloride and vinyl chloride.

RALPH T. K. CORNWELL.

REFERENCES CITED

The following references are of record in the file of this patent:

UNITED STATES PATENTS

| Number | Name | Date |
|---|---|---|
| 2,095,129 | Drew | Oct. 5, 1937 |
| 2,130,530 | Fletcher | Sept. 20, 1938 |
| 2,345,543 | Wohnsiedler et al. | Mar. 28, 1944 |
| 2,346,417 | Cornwell et al. | Apr. 11, 1944 |
| 2,394,009 | Pollard | Feb. 5, 1946 |
| 2,417,014 | Pollard | Mar. 4, 1947 |